United States Patent [19]

Maekawa et al.

[11] Patent Number: 4,612,451
[45] Date of Patent: Sep. 16, 1986

[54] DRIVE CIRCUIT FOR DRIVING A TRANSISTOR

[75] Inventors: Hitoshi Maekawa; Michitaka Osawa; Kunio Ando, all of Yokohama, Japan

[73] Assignee: Hitachi, Ltd., Tokyo, Japan

[21] Appl. No.: 583,309

[22] Filed: Feb. 24, 1984

[30] Foreign Application Priority Data

Feb. 25, 1983 [JP] Japan .................................. 58-29302

[51] Int. Cl.[4] ....................... H03K 17/00; H03B 41/00
[52] U.S. Cl. .................................... 307/270; 307/254; 307/280; 307/300
[58] Field of Search ............... 307/270, 280, 300, 297, 307/254

[56] References Cited

U.S. PATENT DOCUMENTS

| 3,986,052 | 10/1976 | Hunter | 307/270 |
| 4,177,393 | 12/1979 | Förster | 307/270 |
| 4,302,807 | 11/1981 | Mentler | 307/280 |
| 4,356,408 | 10/1982 | Glennon | 307/270 |

Primary Examiner—Stanley D. Miller
Assistant Examiner—B. P. Davis
Attorney, Agent, or Firm—Antonelli, Terry & Wands

[57] ABSTRACT

A drive circuit having a transformer with its secondary winding connected to the base of a transistor and its primary winding connected to a drive source by which the transistor is driven to switch, wherein a directional element is connected between a tap provided on the secondary winding and one end of the secondary winding so as to select the ratio between the forward base current and reverse base current of the transistor.

4 Claims, 4 Drawing Figures

DRIVE CIRCUIT FOR DRIVING A TRANSISTOR

This invention relates to a drive circuit having a transformer of which the secondary winding is connected to the base of a transistor to feed a base current and of which the primary winding is connected to a drive source driving the transistor in a switching operation.

An example, of such drive circuit is shown in FIG. 1 in which an output transistor in a horizontal deflection circuit of a television set is driven by the drive circuit. Referring to FIG. 1, there are shown capacitors 1, 4, 10 and 13, resistors 2 and 5, a drive transistor 3, a drive transformer 6, an output transistor 7, a damper diode 8, a deflection yoke 9, a flyback transformer 11, and a high-voltage rectifying diode 12.

FIG. 2 shows signal waveforms at respective portions in operation. The waveform at A is of the voltage (hereinafter referred to as drive pulse) at the collector of the drive transistor 3 in FIG. 1. The waveform at B is of the current flowing in the primary winding of the drive transformer 6. The waveform at C is of the base voltage ($V_{BE}$) of the output transistor 7. The waveform at D is of the base current of the output transistor 7 (the forward base current of the output transistor 7 is assumed to be positive). The waveform at E is of the collector voltage of the output transistor 7. At the base current D of the output transistor 7, the forward base current and reverse base current are represented by $i_{B1}$ and $i_{B2}$, respectively.

The circuit operation will be described with reference to FIGS. 1 and 2. The drive transistor 3 is operated in switching operation by a horizontal oscillation pulse $H_{osc}$ as shown in FIG. 2A. Now, let us consider the state at $t_0$. Since before time $t_0$, the base current $I_{B1}$ is flowed to the base of the output transistor 7, causing it to perform switching operation, the transistor 7 is conductive in overexcited state. In the drive transformer 6, primary-to-secondary turns ratio is 1:n, the beginning of each winding is indicated by the black dot ".", and when the drive transistor 3 becomes conductive at time $t_0$, a voltage $v_2$ is induced in the secondary winding of the transformer 6 in the direction shown in FIG. 1. The voltage, $v_{BE}$ between the base and emitter of the output transistor 7 is a positive value as shown in FIG. 2C until the accumulated minority carriers stop from recombination. This value is substantially the same as in the case in which the forward base current is flowed. In other words, during the storage time, $T_{so}$ (from time $t_0$ to $t_1$) of the output transistor 7, the electromotive force $v_2$ is in the forward direction relative to the base-emitter junction and thus the peak current of $I_{B2}$ is flowed as shown in FIG. 2D. At this time, current of about 1/n times that in the secondary is flowed in the primary of the drive transformer 6 chiefly from the charged capacitor 4 as shown in FIG. 2B. At time $t_1$, the output transistor 7 ends its storage time and is reverse-biased between the base and emitter. Consequently, the base current thereof is sharply decreased. At the same time, the collector current of the output transistor 7 is decreased from the maximum value $I_{cp}$ to zero and thus cut off.

At this time, the primary current of the drive transformer 6 cannot be rapidly decreased, i.e., current is flowed in the primary from time $t_1$ to $t_2$ as shown in FIG. 2B so as to cancel out the magnetic flux due to the rapid change of secondary current of the transformer. The value of the primary current during the time $t_2$ to $t_3$ is determined by the impedance of the primary of the drive transformer and the resistance 5. When the drive transistor 3 is cut off at time $t_3$, the secondary current of the drive transformer 6 is flowed and opposed to the change of magnetic flux due to the rapid decrease of the primary current, or in the forward direction between the base and emitter of the output transistor 7 as shown in FIG. 2D. Accordingly, during the period in which the forward base current is flowed, the electromotive force $v_2$ is in the reverse direction to that in FIG. 1.

Here, it is assumed that for both cases when the output transistor 7 is cut off and conducting in saturation, the change of flux in the drive transformer 6 is substantially equal and the electromotive force is $v_1$. In addition, it is assumed that the input impedance, $Z_{TR}$ of the output transistor 7 when viewing from the base, is about the same for the storage period and forward conducting period of the output transistor 7, and that the input impedance of the transformer 6 when viewing from the secondary of the transformer 6, is represented by $Z_T$. Then, the base currents $i_{B1}$ and $i_{B2}$ are expressed as $$i_{B1} = \frac{v_2 - v_{BE}}{Z_T + Z_{TR}},$$

$$i_{B2} = \frac{v_2 + v_{BE}}{Z_T + Z_{TR}}$$

Thus, $i_{B1} < i_{B2}$. Generally, $$\frac{i_{B2}}{i_{B1}} \approx 1.2 \text{ to } 1.4.$$

The maximum values $I_{B1}$ and $I_{B2}$ of the $i_{B1}$ and $i_{B2}$ are determined by the amount of charge stored in the limiting capacitor 4 ($C_s$). The best condition is achieved when the period $T_{DOFF}$ in which the capacitor 4 is charged is nearly equal to $C_s R_s$.

Thus, the output transistor 7 carries out switching operation and the well known deflection circuit shown in FIG. 1 produces necessary deflection current and high voltage.

If, now, the deflection frequency is increased to enable high precision displaying and so on, the loss in the period of the fall time $t_f$ of the output transistor 7 become problem. The loss $P_s$ in period of the fall time $t_f$ is expressed by $P_s \propto P_H \cdot t_f^2 \cdot f_H^3$ [here, it is assumed that the scanning line ratio (scanning period/horizontal period) is constant]. In the above expression, $P_H$ is the deflection power index and $f_H$ the horizontal deflection frequency.

From the above expression, it will be evident that when the deflection frequency $f_H$ is increased, the reduction of the loss $P_s$ can be expected only by decreasing the fall time $t_f$ because the deflection power index can hardly be expected to be decreased. The transistor of short $t_f$ has been developed by device reserchers; for example, an bipolar transistor of collecter current, 5A and breakdown voltage, 1,300 V (the maximum voltage between the collector and base with the emitter open) has 200 nsec or below of $t_f$.

The transistors generally used in television sets and so on have about 1 μsec of $t_f$. In the case using transistor having the same $P_H$ as that used in the general television set, the deflection frequency at which substantially the same power loss $P_s$ is caused is about 46 kHz. When the deflection frequency exceeds 45 kHz, the power loss is increased in proportion to the cube of the frequency, or to $$\left(\frac{f_H}{46 \text{ kHz}}\right)^3$$

as compared with the temperature increase of the output transistor in the general television set. When the fall time of the output transistor is shortened, the temperature characteristic of the fall time tends to be degraded. For example, in the transistor with $t_f$ of 200 nsec, the $t_f$ at 150° C. is three times or above larger than that at the normal temperature (in general, 1.5 to 2 times larger). In other words, the transistor designed to operate for high-speed switching at the normal temperature has poor temperature characteristic of $t_f$. If temperature is increased by any cause, the $t_f$ is increased and then temperature-rise is accelerated, thereby to occure thermal runaway causing breakdown of the transistor. In a transistor designed not for a particular use, or designed to have somewhat short $t_f$ at the normal temperature, when the transistor is operated at high frequency, the temperature of the transistor is increased due to the loss in period of the fall time $t_f$ and then the transistor is developed into the breakdown by the thermal runaway.

It is an object of this invention to provide a high-reliability drive circuit with no drawbacks of the prior art, capable of reducing the fall time of the output transistor, thereby lowering the loss at the output transistor and preventing the output transistor from thermal runaway.

According to this invention, there is provided a drive circuit having a transformer provided with a tap on its secondary winding so that the ratio between the forward base current and reverse base current of a transistor to be driven by the drive circuit is arbitrarily selected by a diode switch, thereby reducing the fall time of the transistor.

The invention will become more readily understood from the following exemplary description taken with the accompanying drawing, wherein.

Figure 1:
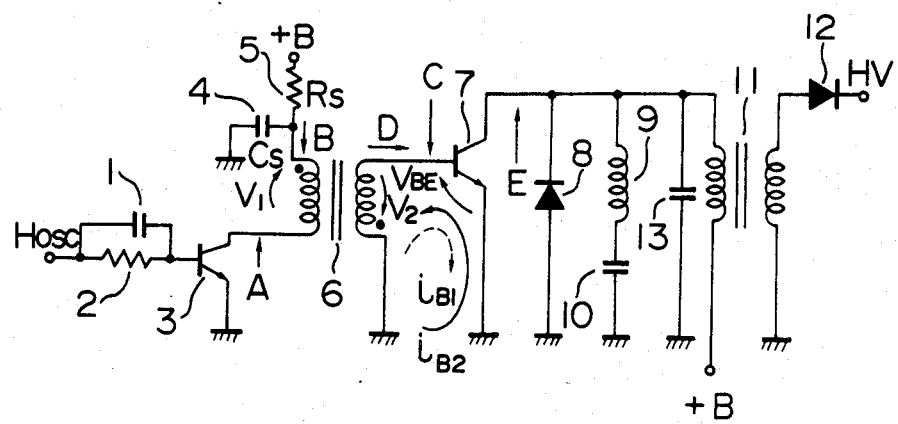
FIG. 1 is a circuit diagram of a conventional drive circuit.
Figure 2:
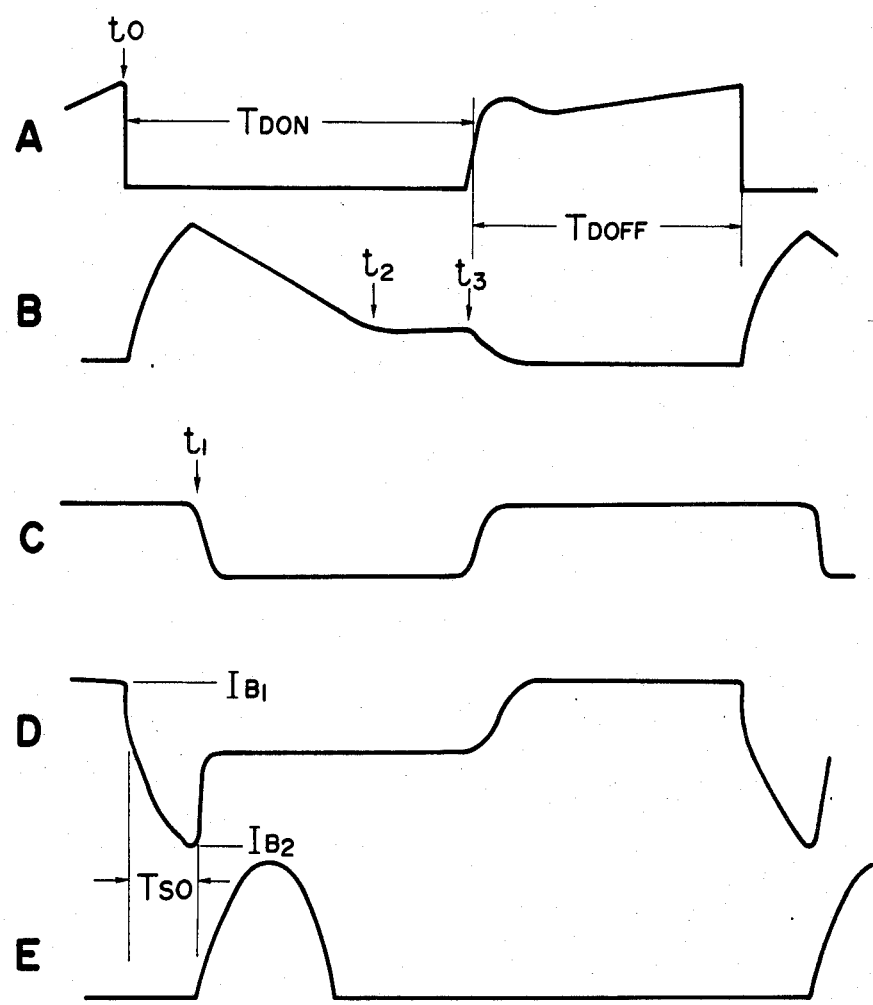
FIG. 2 is a diagram of waveforms at respective operating portions in FIG. 1.
Figure 3:
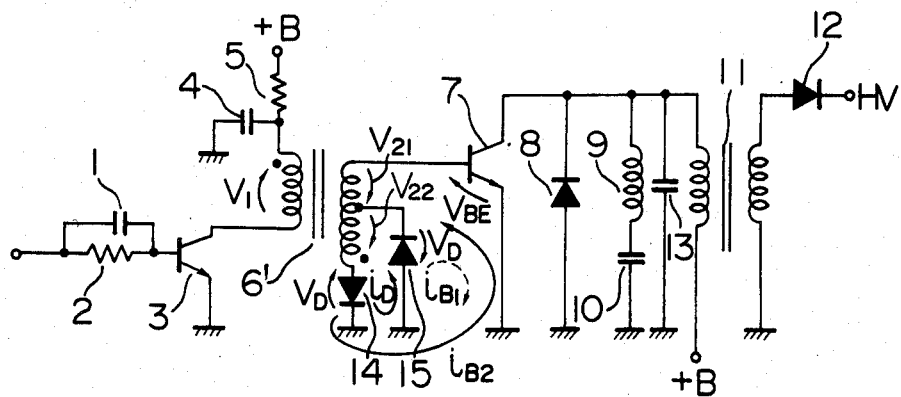
FIGS. 3 and 4 are circuit diagrams of embodiments of this invention.
Figure 4:
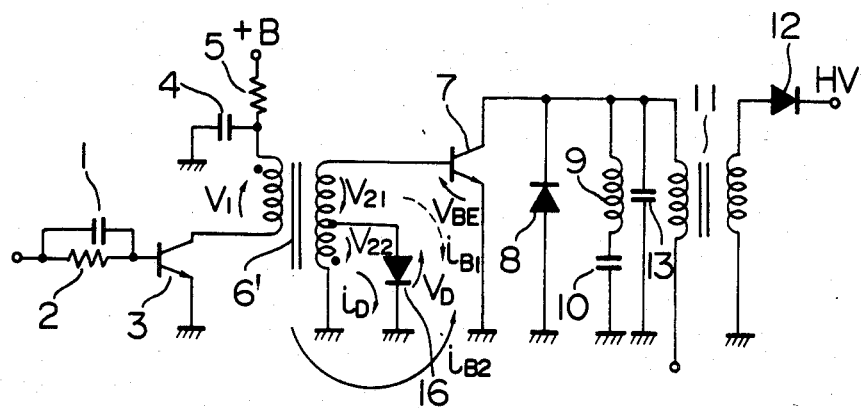

Embodiments of this invention will be described with reference to FIGS. 3 and 4. FIGS. 3 and 4 are circuit diagrams of different embodiments of the invention. In FIGS. 3 and 4, like parts corresponding to those of FIG. 1 are identified by the same reference numerals.

In FIG. 3, the drive transistor 3 and output transistor 7 operate in the same switching way as in the prior art, and thus will not be described in detail.

In the embodiment of FIG. 3, a drive transformer 1' has a tap at a desired mid position of its secondary winding, and a diode 15 is connected between the tap and ground as illustrated. A diode 14 is connected between the beginining end of the secondary winding of the transformer and ground. Let us find the forward base current $i_{B1}$ and reverse base current $i_{B2}$ of the output transistor 7 in this drive circuit similar to the prior art. Assuming that the impedance of the diode 14, 15 is represented by $Z_D$, and the forward voltage drop thereof by $v_D$, then .

$$i_{B1} = \frac{v_{21} - v_{BE} - v_D}{Z_T \cdot \frac{v_{21}}{v_{21} + v_{22}} + Z_{TR} + Z_D}$$

$$i_{B2} \approx \frac{v_{21} + v_{22}}{Z_T + Z_{TR} + Z_D} \quad (\because v_D \approx v_{BE})$$

From the above expressions, the ratio between the maximum values $I_{B1}$ and $I_{B2}$ of $i_{B1}$ and $i_{B2}$ can be changed arbitrarily by the number of turns to be made the tap of the drive transformer 6'. The rise time of the output transistor upon switching, $t_r$; the storage time thereof, $t_s$; and the fall time, $t_f$ can be expressed by using the charge control model method as $$t_r = \tau_b \ln\left(\frac{1}{1 - 0.9 \frac{I_{BS}}{I_{B1}}}\right)$$

$$t_s = \tau_s \ln\left(\frac{1 + \frac{I_{B2}}{I_{B1}}}{\frac{I_{BS}}{I_{B1}} + \frac{I_{B2}}{I_{B1}}}\right)$$

$$(I_{B2} > 0)$$

$$t_f = \tau_b \ln\left(\frac{1 + \frac{I_{B2}}{I_{B1}}}{0.1 + \frac{I_{B2}}{I_{BS}}}\right)$$

where $\tau_b$ is the base constant of the charge control, $\tau_s$ is the saturated region charge control parameter, and $I_{BS}$ is the base saturation current.

Thus, the rise time $t_r$ is short if $I_{B1}$ is large, the storage time $t_s$ is short if $$\frac{I_{B2}}{I_{B1}}$$

is large, and the fall time $t_f$ is short if $I_{B2}$ is large. In other words, in order for the horizontal deflection output transistor to have short storage time $t_s$ and fall time $t_f$ and to operate properly, it is necessary to increase the $$\frac{I_{B2}}{I_{B1}}$$

ratio.

According to this first embodiment of this invention as shown in FIG. 3, the $$\frac{I_{B2}}{I_{B1}}$$

ratio can be selected to be an arbitrary value, and the fall time $t_f$ and storage time $t_s$ can be made short.

A second embodiment of the invention will be described with reference to FIG. 4. The second embodiment is different from the first embodiment in the number, positions and polarity, of diodes used. A diode 16 is connected between the tap and ground, with its anode connected to ground.

In FIG. 4, the operation of the drive transistor 3 and output transistor 7 is the same as in FIGS. 1 and 3, and thus will not be described. In the same way as in the first embodiment, $i_{B1}$ and $i_{B2}$ can be expressed as $$i_{B1} = \frac{v_{21} + v_{22}\left(1 - Z_T \cdot \frac{1}{v_{21} + v_{22}} i_D\right) - v_{BE}}{Z_T + Z_{TR}}$$

$$i_{B2} \approx \frac{v_{21} + v_{22} + v_{BE}}{Z_T + Z_{TR}}$$

According to that the electromotive fource $v_{22}$ is lessened by the voltage drop across an impedance of the winding at which $i_D$ and $v_{22}$ are induced, the maximum values $I_{B1}$ and $I_{B2}$ of $i_{B1}$ and $i_{B2}$ can be arbitrarily selected corresponding to the position of the tap on the drive transformer 6'. Thus, the same effect as in the first embodiment can be achieved.

As mentioned above, if the ratio between the $I_{B1}$ and $I_{B2}$ can be arbitrarily selected by providing a tap on the drive transformer (or two or more windings) and a diode, the drive circuit can be used in the same manner as the first embodiment.

Moreover, while a horizontal deflection circuit is used in the above embodiments, this invention can be applied to other drive circuits for driving output transistor at high frequency.

According to the drive circuit of the invention, the fall time of the transistor to be driven can be 20 to 30% shorter, so as to reduce power loss, effect on prevention of thermal runaway and improve reliability. In addition since the storage time becomes short, it is effective to increase the switching speed of the switching circuit.

We claim:

1. A drive circuit for performing a switching operation on a transistor, comprising:
   a coupling transformer having primary and secondary windings, one end of said secondary winding being coupled to a base of said transistor for feeding base current into said tansistor, and said transistor being driven through said primary winding of said transformer;
   a tap provided on said secondary winding; and
   a directional element connected between said tap and the other end of said secondary winding, said directional element being so arranged that a forward base drive current is supplied to said transistor from said one end and said tap of said secondary winding and a reverse base drive current is supplied to said transistor from said one end and the other end of said secondary winding.

2. A drive circuit according to claim 1, wherein said directional element includes two diodes connected in series in the same direction so that the connection point between said two diodes and the other end of said secondary winding are used as the terminals providing a drive signal to said transistor.

3. A drive circuit according to claim 1, wherein the opposite ends of said secondary winding are used as said terminals providing a drive signal to said transistor.

4. A drive circuit according to claim 1, wherein said directional element comprises a single diode connected between said tap and said the other end of said secondary winding.

* * * * *